United States Patent
Wiklof (10) Patent No.: US 8,942,533 B2
(45) Date of Patent: Jan. 27, 2015

(54) RECORDER WITH RETROSPECTIVE CAPTURE

(76) Inventor: Christopher A. Wiklof, Everett, WA (US)

( * ) Notice: Subject to any disclaimer, the term of this patent is extended or adjusted under 35 U.S.C. 154(b) by 938 days.

(21) Appl. No.: 12/554,656

(22) Filed: Sep. 4, 2009

(65) Prior Publication Data

US 2009/0324203 A1      Dec. 31, 2009

Related U.S. Application Data

(63) Continuation of application No. PCT/US2008/003174, filed on Mar. 7, 2008.

(60) Provisional application No. 60/905,746, filed on Mar. 7, 2007.

(51) Int. Cl.
| | | |
|---|---|---|
| *H04N 5/76* | (2006.01) | |
| *H04N 9/79* | (2006.01) | |
| *H04N 5/77* | (2006.01) | |
| *H04N 1/00* | (2006.01) | |
| *H04N 1/21* | (2006.01) | |
| *H04N 5/232* | (2006.01) | |
| *H04N 101/00* | (2006.01) | |

(52) U.S. Cl.
CPC ........... *H04N 5/772* (2013.01); *H04N 1/00933* (2013.01); *H04N 1/2112* (2013.01); *H04N 1/2141* (2013.01); *H04N 1/215* (2013.01); *H04N 5/232* (2013.01); *H04N 2101/00* (2013.01); *H04N 2201/0084* (2013.01)
USPC ........................................... 386/200; 386/291

(58) Field of Classification Search
USPC .................... 386/223–234, 239–248
See application file for complete search history.

(56) References Cited

U.S. PATENT DOCUMENTS

| | | | | |
|---|---|---|---|---|
| 6,009,036 | A * | 12/1999 | Takasugi | 365/230.01 |
| 6,879,340 | B1 * | 4/2005 | Chevallier | 348/207.99 |
| 2002/0005895 | A1 * | 1/2002 | Freeman et al. | 348/143 |
| 2002/0191952 | A1 * | 12/2002 | Fiore et al. | 386/46 |
| 2003/0040917 | A1 | 2/2003 | Fiedler | |
| 2004/0013406 | A1 * | 1/2004 | Barton et al. | 386/69 |
| 2004/0028381 | A1 | 2/2004 | Kim | |
| 2004/0172177 | A1 * | 9/2004 | Nagai et al. | 701/29 |
| 2006/0045468 | A1 * | 3/2006 | Okazaki et al. | 386/52 |

FOREIGN PATENT DOCUMENTS

| | | | |
|---|---|---|---|
| EP | 01017240 | 5/2001 | |
| KR | 10-2000-0051776 | 8/2000 | |
| WO | WO 92/22983 | * 12/1992 | ............. H04N 5/781 |

* cited by examiner

*Primary Examiner* — Thai Tran (74) *Attorney, Agent, or Firm* — Christopher A. Wiklof; Launchpad IP, Inc.

(57) ABSTRACT

A system and method allows a user to enter a command capture audio, video, and/or still pictures that commence at a moment in time earlier than entering the command.

24 Claims, 5 Drawing Sheets

RECORDER WITH RETROSPECTIVE CAPTURE

CROSS REFERENCE TO RELATED APPLICATIONS

This application is a continuation of International Application No. PCT/US2008/003174, entitled RECORDER WITH RETROSPECTIVE CAPTURE, filed Mar. 7, 2008, which claims priority from U.S. Provisional Application No. 60/905,746; entitled RECORDER WITH RETROSPECTIVE CAPTURE; filed Mar. 7, 2007 which are incorporated herein by reference.

BACKGROUND

In the use of conventional digital still cameras, conventional video cameras, and conventional sound recorders, the user may be disappointed because they fail to activate the shutter or record command button just prior to or substantially simultaneously with a scene, utterance, or other real time event desired to be recorded. This disappointment may arise because the user does not anticipate the real time event prior to its occurrence or is otherwise distracted and does not press the shutter or record button in time to record the event.

In other cases where recording is substantially continuous, the resultant recording is so voluminous as to defy a cursory attempt to find the portion of the recording corresponding to a real time event at a subsequent viewing, listening or editing session. Instead, the user must search, frequently rather laboriously, to find the fleeting event in the voluminous entirety of the recording.

In still other cases, even when a real time event is captured, a recording of events leading up to the real time event is not captured, and thus context corresponding to the captured scene, utterance, or other real time event may be lost.

OVERVIEW

In a first embodiment according to the invention, a recording apparatus captures a signal and sends it to a memory, such as a first-in-first-out (FIFO) memory, cache or storage device that provisionally captures a real time event. Data corresponding to signals that are sent to the provisional capture memory, also referred to as provisional data, eventually overflows and is discarded unless a shutter or record command, also referred to as a trigger signal, is received. The trigger signal causes the provisional data to be retained, for example by transferring the provisional data to non-volatile memory or storage, or by retaining the provisional data in the provisional capture memory.

A user of the recording apparatus may thus capture records of events that happened prior to triggering capture.

According to some embodiments, the provisional data will continue to be transferred to non-volatile memory or storage or continue to be retained in the provisional capture memory until a timeout is encountered or until the user enables a second trigger event. The timeout or second trigger event may toggle the apparatus back to the provisional capture mode, also referred to as the overflow mode.

According to another embodiment, a recording apparatus captures an event as a signal and transfers it to storage or non-volatile memory for retention. A trigger signal may be received to mark a particular portion of the recorded signal. The trigger events may be logged in a variety of ways, including but not limited to steganographic insertion into data corresponding the signal, recording into a controller track, recording into a look-up table (LUT), recording into the data as a visible or audible mark, etc.

Various forms of recording devices may be used, including but not limited to a digital still camera, a video recorder, an audio recorder, etc.

According to one embodiment, the recording device is a camera mounted on the user. Such a camera may be bore-sighted with the user's field of view to record events in the direction of the user's gaze. A bore-sighted camera may capture signals as video, as a series of still images, or both. A bore-sighted camera may further capture audio.

According to another embodiment, the recording device is a video or still camera that is not bore-sighted. Such a device may be aimed by a user or mounted remotely to capture a desired field-of-view.

According to another embodiment, the recording device is an audio recorder. The retrospective triggering of the audio recorder may be used to mark important portions of a recording to facilitate later search and/or parsing of the recorded signal.

Various trigger apparatuses may be used according to embodiments. For example, a user may select a trigger event by pressing a button, uttering a phrase, making a movement, blowing a puff of air, creating an audio click, creating a signal continuity or discontinuity, or other triggering methods as are known to the art.

DETAILED DESCRIPTION

In the following detailed description, reference is made to the accompanying drawings, which form a part hereof. In the drawings, similar symbols typically identify similar components, unless context dictates otherwise. Other embodiments may be used and/or and other changes may be made without departing from the spirit or scope of the disclosure.

A numbering convention to facilitate easy understanding by the reader is used herein. Figures are numbered in conventional consecutive order. Specific features are generally indexed consecutively using three or four digit numbers in the order described. The first one or two digits correspond to the figure number in which the feature is first described. Features having similar functionality generally retain their originally assigned number throughout, even though their physical or logical appearance may vary considerably from figure to figure.

As used herein, the terms image, recorder, and image signal may refer respectively to various observable phenomena, devices or transducers for capturing such phenomena, and signals output by such capture apparatuses or devices corresponding to the captured phenomena. For example, in an illustrative embodiment, an image may include a visible field-of-view, a corresponding recorder may include a digital camera, and the corresponding image signal may include an electrical signal carrying the captured data, such as a serial or parallel sequence of voltage or current transitions communicated from the digital camera to a buffer memory or a storage apparatus. The image may be still or video and/or may include audio. According to another illustrative embodiment, the image may be purely audio with the recorder being a microphone and the image signal being, for example, an electrical representation of the microphone output. To facilitate ease of understanding the term "image" may be used as shorthand to indicate both an original real-time observed phenomenon and an electrical signal or data representative of the observed phenomenon.

As used herein, the term "permanent" is used not only to denote a substantially irreversible action, such as recording an image onto a writable optical disc, but also to denote an action that is permanent in a relative sense, such as recording an image into an area of persistent random-access memory (RAM), recording onto flash memory, writing to rotating magnetic memory, etc. Thus, references to "storage" may be taken to include both conventional storage apparatuses and media such as a hard drive, and to functionally persistent memory such as, for example, a volatile memory device that is refreshed to keep the image in memory for more than a relatively transient duration.

Figure 1:
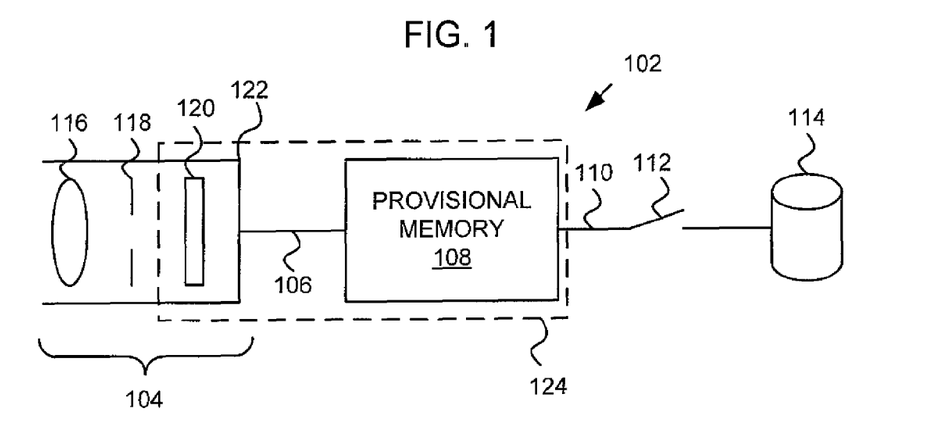
FIG. 1 is a block diagram of a retrospective recorder, according to an embodiment.

Referring now to FIG. 1, an embodiment of a retrospective recorder 102 is shown in block diagram form. A capture apparatus 104, here illustrated as a digital camera or video recorder, may be operable to output an image signal representative of a captured image to a provisional memory 108 via a data channel 106. For example, the image signal may include a raw or compressed stream of video frames, such as in AVI video envelopes. According to an embodiment, the image data may be loaded into the memory 108 as a sequence of linked groups, each group including a reference frame and a header formatted for playback starting from the present group. According to an embodiment, the memory 108 may be configured as a first-in-first-out (FIFO) buffer memory configured to overflow the oldest group for each new group received. The memory 108 may be configured to substantially continuously accept image signals from the image capture apparatus 104.

The data channel 106 may be considered to transmit "provisional" images from the image capture apparatus 104. Similarly, the memory circuit 108 may be considered to include "provisional memory" configured to temporarily hold provisional image data corresponding to provisionally captured video images. According to embodiments, the provisional memory 108 may include a first-in-first-out (FIFO) memory configured to overflow the oldest data or a circular buffer configured to overwrite the oldest data, for example For the example of FIG. 1, capture apparatus 104 is shown as a digital camera that includes a lens 116, an aperture 118, and a light sensor array 120, all held in alignment by housing 122. As may be seen, such an apparatus may include a conventional digital still or digital video image sensor, and may be constructed according to a range of architectures.

When provisional capture is initiated, an image signal begins to be transmitted from the capture device 104 over signal line, node, or terminal 106 to memory circuitry 108. As time progresses, memory 108 fills up and the first-captured image is shifted out of the memory 108 through node or terminal 110 and is discarded. Alternatively, the newest provisionally captured image may overwrite the oldest provisionally captured image.

The data capacity of, and hence the amount of time for which provisional images are temporarily held in memory 108 may be determined according to application requirements, recorder cost and size constraints, power consumption, etc. For the case of a series of discrete images, the data capacity of memory 108 affects the number of discrete images that may be temporarily held. According to some embodiments, the provisional memory 108 capacity may be dynamically allocated according to user preferences, image attributes, or other operational considerations.

Furthermore, the rate of provisional image capture performed by the capture apparatus 104 and the quality of the provisional images captured by the capture apparatus 104 may be dynamically determined according to user preferences, image attributes, sensed values (e.g. acceleration, finger pressure, etc.), or other operational considerations.

According to an embodiment, at least a portion of the image capture apparatus 102 including the image sensor 120, the image signal line, node, or terminal 106, and the provisional memory circuitry 108 may be integrated into a module 124, such as an integrated circuit. An integrated embodiment, which may optionally include processing logic such as image compression hardware (not shown) and local control logic such as a state machine (not shown), may be advantageous with respect to size, power consumption, cost, etc. and may allow the apparatus to remain in a provisional capture state for a relatively extended period of time with minimal battery requirements. According to an embodiment, an apparatus operable to draw power from the environment, such as a photovoltaic apparatus, heat pump, electromechanical inductive charger, etc. (not shown) may be coupled to a capture apparatus 104, optional compression hardware (not shown), provisional memory 108, and other optional components such as control logic, sensor(s), etc. (not shown) to remain in the provisional capture state for extended periods of time.

As may be appreciated, the memory 108 at any instant in time after initiation of the provisional capture state holds a record of previously received images. In the case of a digital video camera, such a historical record may include, for example, 1 to 60 seconds of previously captured images. As indicated above, such previously recorded images are written-over or overflowed and discarded while the system stays in the provisional capture state of operation.

In the event a user decides that the images are to be saved, the overflow terminal 110 may be operatively coupled to a storage element 114 by a coupling device 112. The coupling device may, for example, be actuated by a user command such as a shutter button or trigger press. When the coupling device 112 couples the output terminal to a storage element 114, the provisional images are transmitted out of provisional memory 108 and into storage 114. In the example of FIG. 1, this event may be envisioned as closing a user-activated switch 112 to couple the output line 110 of memory 108 to storage element 114. Alternative interfaces between memory 108 and storage 114 such as bus-mediated serial or parallel data transfer; transistors, relays, or other controllable connections, etc. may be used. Images coupled to storage 114 are thus captured "permanently" as with a conventional digital camera or digital video recorder.

The period during which images are cached in memory 108, inter alia, allows a user time to respond to and record a dynamic event that would otherwise have been missed. To a user, pressing the shutter button or trigger performs what seems like capturing an image of the past (or at least capturing data beginning from a moment earlier than the real time moment the user activated the coupling device 112).

Thus, according to embodiments, baby's first steps, an athletic achievement, a spectacular "wipe-out", a noteworthy quote, or other transient event may be captured without requiring storage and later editing of large amounts of data. According to embodiments, a portable image or voice capture system may remain in provisional capture mode for an extended period of time without allocating large amounts of non-volatile memory to data that would need to be later deleted. Non-volatile memory or storage is only allocated to image (audio, etc.) storage when the provisionally captured real time event possesses qualities that the user judges to merit allocation of non-volatile memory or storage.

As indicated above, the capture apparatus 104 and provisional memory 108 may, according to some embodiments, be integrated and made very low power. Actions that require more power, such as transmitting and/or permanently storing the image signal, may thus be eliminated during provisional image capture, reducing overall power consumption and enhancing battery life compared to conventional recorders that only permanently record images.

According to embodiments, the capture apparatus 102 and other variants may include a digital hand-held still camera, a digital hand-held video camera, a camera phone, a computer with web-cam, a digital voice recorder, a head-mounted camera, a wireless headset, or other apparatus with a recording capability.

Figure 2:
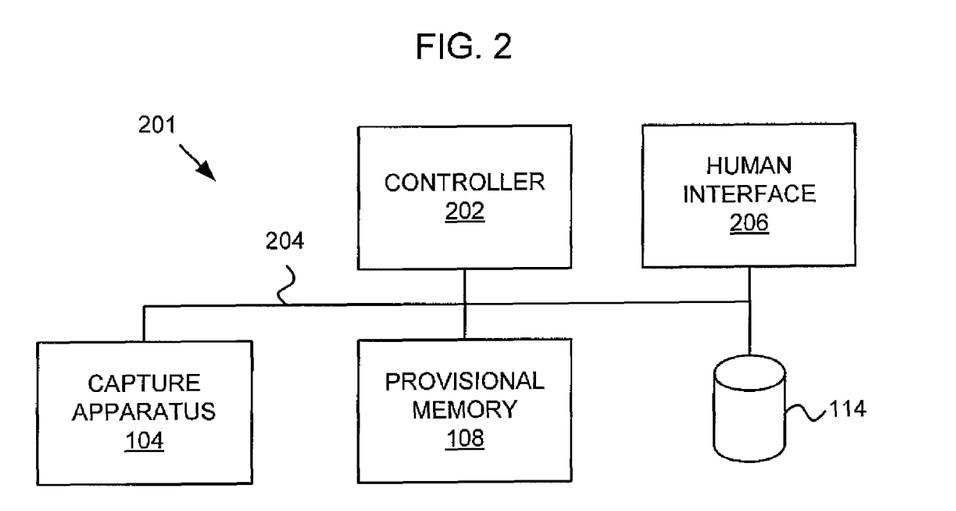
FIG. 2 is a block diagram of a retrospective recorder, according to another embodiment.

FIG. 2 illustrates a retrospective recorder 201 having an electronic controller 202, such as a microcontroller, interconnected with the capture apparatus 104, provisional memory 108, human interface 206, and storage apparatus 114 via a bus 204. According to an embodiment, the human interface may include a record switch, shutter button, trigger, etc. configured to select the operating mode. When the user selects a provisional capture mode, the captured signal from the capture apparatus 104 may be loaded into the provisional memory 108, which then overflows or is overwritten while the retrorespective recorder 201 remains in provisional capture mode. When the user recognizes that the real time actions (which have been provisionally captured) warrant permanent recording, the user may activate the human interface to change to a recording mode of operation. When the record mode is entered, provisional data from the provisional memory may be transferred to storage memory 114 as the capture apparatus 104 continues to capture the action.

For example, in the record mode, the microcontroller 202 may transfer provisional images from the provisional memory 108 to the storage 114 across the bus 204. Alternatively, for embodiments where provisional image memory and the image storage are implemented as one or an array of physical devices, microcontroller 202 may, when a "record" command is received, allocate memory holding provisional images as storage to prevent the images from being written-over.

Figure 3:
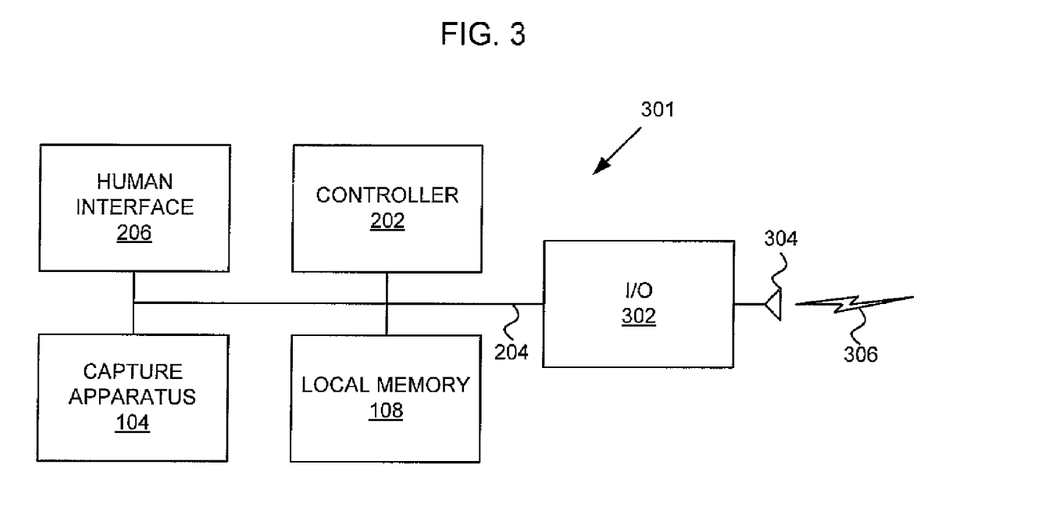
FIG. 3 is a block diagram of a retrospective recorder having local memory and an interface to remote image storage, according to an embodiment.

FIG. 3 illustrates a retrospective recorder embodiment 301 including a local capture apparatus 104, local memory 302, a local controller 202, a human interface 206, and a data interface 304 coupled together by a data bus 204. A portion of the local memory 302 may be configured as provisional memory. According to one embodiment, another or a selectable portion of the local memory 302 may be configured as permanent storage. According to another embodiment, the apparatus 301 may be substantially devoid of permanent image memory and instead, when a user command to enter record mode is received through the human interface 206, provisionally captured images are transferred out through the data interface 304 as an output signal 308. The data interface is here exemplified by a wireless interface, such as a transmitter/receiver, having an antenna 306 that is configured to transmit the image data as modulated radio signal 308. Images selected for retrospective capture may thus be permanently retained on remote storage (not shown).

According to one illustrative embodiment, the retrospective recorder 301 is embedded in a wireless communication device such as a cellular telephone, and the modulated radio signal 308 represents transmission to a conventional cellular telephone system. According to another exemplary embodiment, retrospective recorder 102 is configured as a head-mounted and/or bore-sighted video camera, and modulated radio signal 308 represents a short range signal such as a Bluetooth link, IEEE 802.11 link or other wireless link to a nearby receiving and storage apparatus. According to other embodiments, a wired interface, an infrared interface, or other non-radio interface may be substituted for the radio interface illustrated in FIG. 3.

Figure 4:
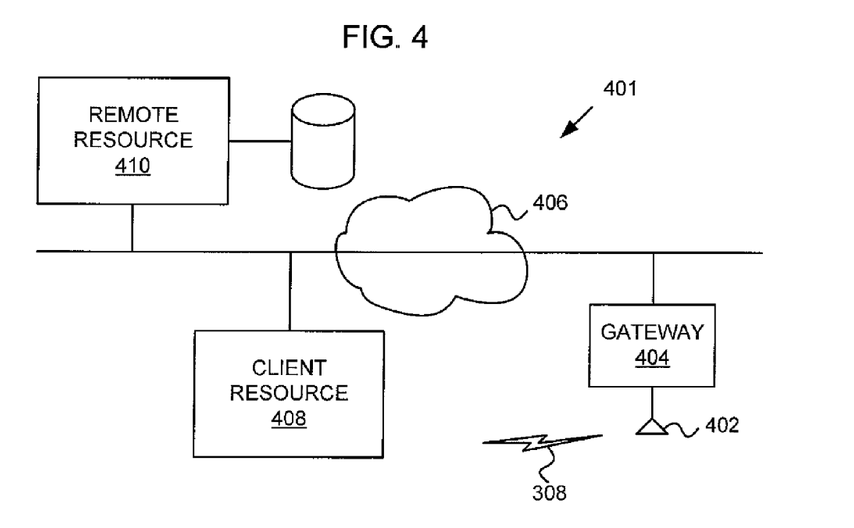
FIG. 4 is a diagram of a network equipped to receive an image from a retrospective capture device, according to an embodiment.

FIG. 4 illustrates a receiving device or network for receiving image data from a remote retrorespective recorder recording device such as shown in the illustrative embodiment 301 of FIG. 3. A gateway 404, which may be a base station, a cellular receiver, an embedded interface in a portable storage device, or other embodiment, receives a wireless signal 308 containing image data through an antenna 402. The gateway 404 may transmit the received image data across an optional network 406. The image signal may be received by a client computer 408, by a server 410, or other entity. As mentioned above, in some embodiments the system 401 may be replaced by a local receiving and storing device such as a personal computer, personal data assistant, MP3 player, or other apparatus equipped to receive and record image signals.

Figure 5:
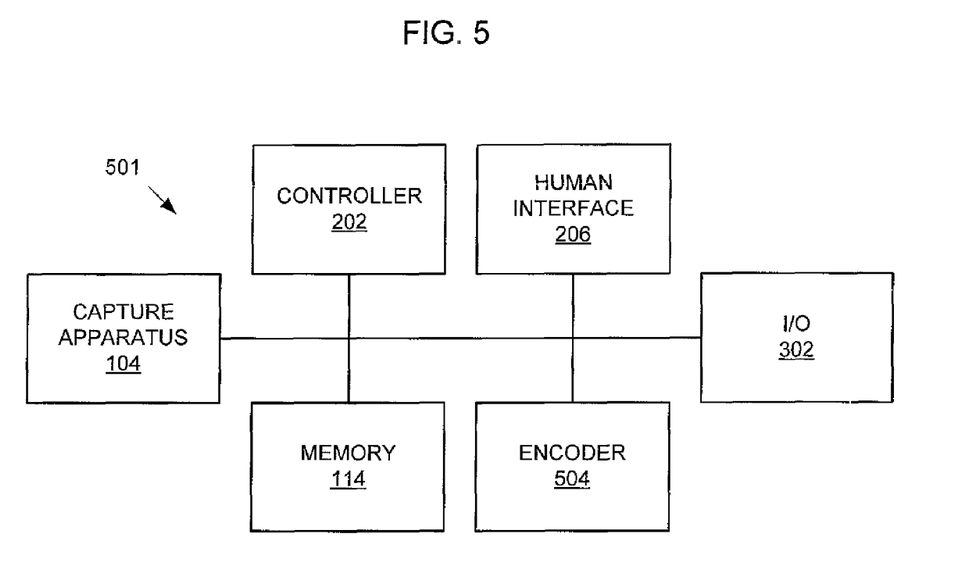
FIG. 5 is a block diagram of a retrospective recorder having an integrated memory, according to an embodiment.

FIG. 5 illustrates an alternative embodiment of a retrorespective recorder 501 that does not use physically- or logically-separated provisional memory 108. Instead, a stream of images is captured by an image capture apparatus 104 and, under control of microcontroller 202, is recorded into storage 114. A user may, upon witnessing a noteworthy event, activate trigger 502. The trigger signal is received by microcontroller 202, and microcontroller activates encoder 504. According to an illustrative embodiment, an encoder 504 creates a mark indicating a moment in time and encodes the mark over the image stream in storage 114, such as by steganography. Alternatively, a mark may be encoded in an index or other facility out-of-band with respect to the recorded image signals in storage 114. Such out-of-band marks may be physically stored in storage 114 or may be stored in a separate physical apparatus. Thus, the marks provide sorting of images and may facilitate later editing and/or selection of images by directing the editor's or viewer's attention to those portions of images that were deemed noteworthy at the time of recording.

According to an embodiment, the mark references a moment in the image stream earlier than the real time moment the user activates the trigger.

According to embodiments, the image stream may consist of or include audio information.

Figure 6:
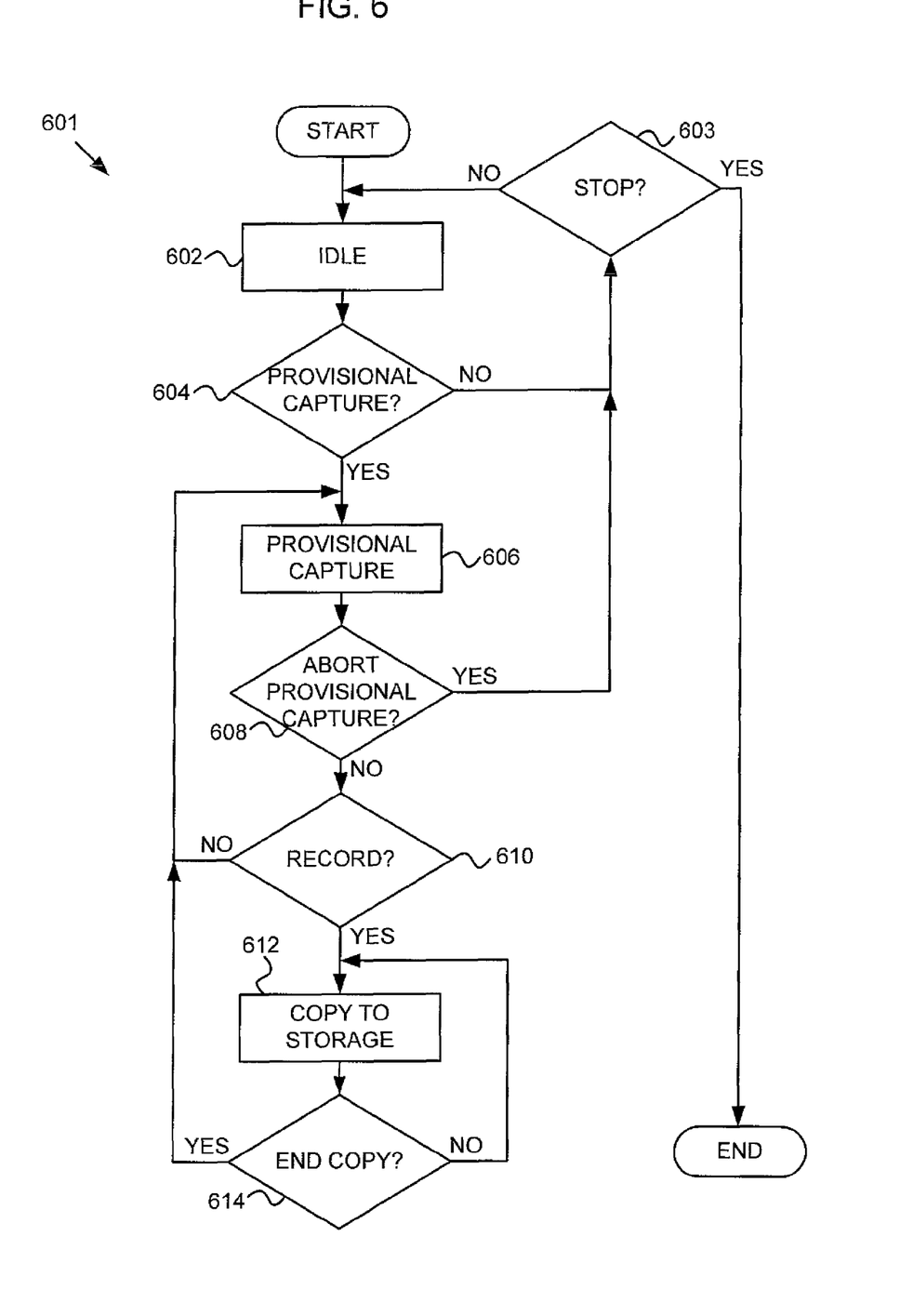
FIG. 6 is a flowchart illustrating logic for retrospectively recording according to an exemplary embodiment.

FIG. 6 is a flowchart illustrating exemplary logic 601 for moving between provisional recording and permanent recording. As shown, the recorder enters an idle state 602 when powered. In the idle state 602, the system may light meter the scene, automatically focus, zoom, set audio sensitivity, etc. Proceeding to decision step 604, system checks to determine if it has been triggered to enter a provisional capture state 606. If not instructed to enter a provisional capture state 606, the system proceeds to decision step 603 where the logic checks to determine if a stop or shutdown command has been received. If a stop command has been received, the process ends, for example by performing a shut-down or entering a sleep mode. If the stop command has not been received, the system re-enters the idle state 602.

If provisional capture is selected in decision step 604, the retrospective recorder enters provisional capture mode 606. In provisional capture mode, images, audio, etc. are provisionally captured by a capture apparatus and a temporarily cached in a provisional memory circuit as provisional data. For the case of substantially continuous images such as video or audio, images may be temporarily cached as streaming data types. For the case of discontinuous images such as where the image capture device is a digital still camera (in still camera mode), discrete images are capture by the image capture device at a frame rate that may be selected by the designer or user according to preferences, and provisionally saved as one or more of a series of discrete images.

While in the provisional capture mode 606, the system monitors inputs in decision step 608 to determine if the user wishes to abort provisional capture mode 606. If an abort command is received, the process proceeds to decision step 603, from there either back to the idle state 606 or to the shutdown or sleep state as described above. If no abort command is received, the process proceeds from step 608 to step 610, where it is determined if a command has been received to enter the record state 612. If not, the system returns to the provisional capture state 606.

If user input is received (indicating that the user wishes to permanently record the provisionally captured image or images), the process proceeds to step 612. In step 612, the system may copy images from the image cache into storage starting with the earliest provisional image. Alternatively, the shutter button or trigger input may act as a command to capture the current image at a high resolution and to transfer lower resolution provisional images to storage. Thus, a high resolution digital image may be accompanied by an earlier (and later) series of image showing events leading up to the image, set-up, posing, etc.

When the system or user issues a command to permanently store provisionally captured images as detected in decision step 610, the system enters a storage mode 612 where one or more previously captured images are written to permanent storage or otherwise designated as permanent images. Such action may be embodiment by physically copying the image signal to a separate storage device or physically segregated region of memory. Alternatively, such action may be embodied by designating regions of memory for storage of the provisionally captured images currently held.

When in storage mode 612, the system monitors for a command to end storage in decision step 614 and return to provisional capture mode 606. According to some embodiments, such a command may be interpreted as arising from release of a shutter button or trigger. Alternatively, the command to exit the storage mode may be made by a second depression of the shutter button or trigger. Alternatively, such a command may be interpreted as arising from storing all images that were substantially in the cache at the moment in time the record command 610 was received. Alternatively, the images from the capture apparatus may continue to be communicated to the storage apparatus for a timed period. Other alternatives will be apparent to those skilled in the art.

Figure 7:
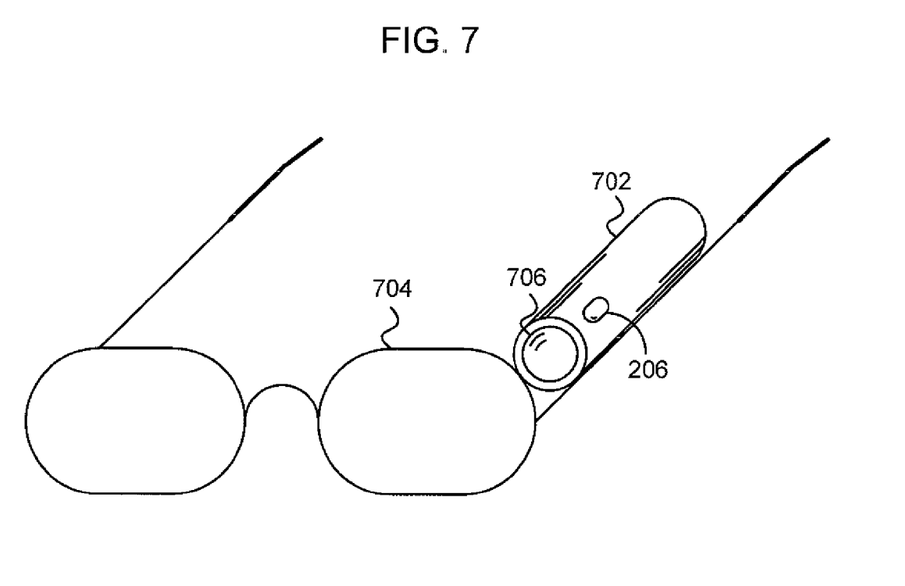
FIG. 7 is a diagram illustrating a head-mounted camera configured for retrospective recording, according to an embodiment.

FIG. 7 is a perspective view of a head-mounted and/or bore-sighted retrospective recording camera 702 mounted on eyewear 704 that may be worn by a user. The illustrative eyewear 704 may be substituted for by a helmet, headset, harness, etc. that may be worn by a user. Camera 702 includes a lens 706 for receiving and focusing light from a scene witnessed by the human wearer and a human interface 206 embodied as a button on the body of the retrospective recording camera for selecting operating modes. For example, a single click indicates the user wishes to enter provisional capture. A second single click indicates the user wishes to record. In some embodiments, an extended click causes images to be permanently recorded for as long as button 206 is depressed. In other embodiments, a second click initiates permanent recording, and images are streamed out of local memory until an "exit record mode" command is issued, such as by another click when in record mode to indicate that the user wishes to exit record mode and resume provisional capture mode. A double click may indicate that the user wishes to abort provisional capture and enter idle mode or power down the head-mounted camera 702. As illustrated in FIG. 7, the head-mounted camera may include a wireless interface for transmitting images to a remote storage apparatus. Alternatively, some or all of the storage memory may be disposed within the camera 702.

A system may include a remote storage apparatus (not shown) having integrated wireless interface, logic for receiving images across the wireless interface, and storage. The remote storage apparatus may be carried in a pocket, held by a belt clip, or otherwise retained on the body of a user. The user may, for instance, simultaneously wear the head-mounted camera apparatus 702.

As used in the specification and claims, the term real time refers to events as they occur live, or to actions performed contemporaneously in response to events as they occur live.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A recording method, comprising:
   continuously capturing a stream of images using a capture element of a portable video recorder;
   simultaneously presenting the stream of images to a user and transmitting the captured stream of images to a provisional memory of the portable video recorder;
   holding each image of the stream of images only for a period of time as provisional data in the provisional memory included in the portable video recorder;
   receiving a user-initiated trigger signal from a user interface included in the portable video recorder; and
   upon receiving the trigger signal, saving all of the provisional data held in the provisional memory at the time of the trigger signal, the provisional data corresponding only to events prior to the trigger signal, as saved data in a permanent memory.

2. The method of claim 1 wherein saving the provisional data as saved data includes transferring the provisional data from a first storage apparatus to a second storage apparatus.

3. The method of claim 1 wherein saving the provisional data as saved data includes holding the provisional data in a storage apparatus.

4. The method of claim 1 wherein saving the provisional data includes transmitting the provisional data to a permanent memory that is separate from the portable video recorder.

5. The method of claim 1, comprising:
   removing the provisional data corresponding to each successive image of the stream of images held in the first memory at the end of the period of time; and
   saving the provisional data as saved data only if the trigger signal is received before the provisional data is removed.

6. The method of claim 1 wherein the provisional data is discarded at the end of the period of time until the trigger signal is received.

7. The method of claim 1 wherein holding each of the stream of images as provisional data includes holding the provisional data according to at least one selected from the group consisting of writing the provisional data to a FIFO memory configured to overflow the oldest provisional data as new provisional data is added, and writing the provisional data to a circular buffer wherein the oldest provisional data is overwritten by the newest provisional data.

8. The method of claim 1 wherein saving the provisional data as saved data includes saving the provisional data in the same order received.

9. The recording method of claim 1, further comprising:
maintaining a capture alignment from a perspective corresponding to the user.

10. The method of claim 1 wherein saving the provisional data as saved data in a permanent memory includes saving the provisional data as saved data in a permanent memory included in the portable video recorder.

11. The method of claim 1 wherein saving the provisional data held in the provisional memory includes:
beginning the saving the provisional data held in the provisional memory at the instant the trigger signal is initiated; and
continuously saving provisional data held in the provisional memory, including provisional data received in the provisional memory from the capture element after the instant the trigger signal is initiated, until a command to end storage is received.

12. The method of claim 1 wherein the provisional memory and the permanent memory are a same storage apparatus, and wherein saving the provisional data as saved data includes marking the provisional data as saved data in the storage apparatus.

13. The method of claim 1 wherein the period of time is user-selectable.

14. The method of claim 1 wherein holding the received image as provisional data includes holding the provisional data as digital data.

15. The method of claim 5 wherein removing the provisional data corresponding to each image of the stream of images held in the first memory at the end of the period of time includes shifting each image of the stream of images out of the first memory.

16. The method of claim 5 wherein removing the provisional data includes overwriting each successive image of the stream of images with a newest received image from the capture element.

17. A portable video recorder for retrospectively recording, comprising:

a capture element configured to produce a continuous stream of video data;
a provisional memory configured to receive the continuous stream of video data as provisional data from the capture element and hold the provisional data for only a span of time after the receipt of the provisional data; and
a user interface contained within the portable video recorder with the provisional memory and the capture element, configured to receive a command from a user to store all of the provisional data existing at the time of the command as permanent data, the provisional data corresponding only to events prior to the command.

18. The portable video recorder of claim 17 wherein the capture element further comprises a head-mounted camera.

19. The portable video recorder of claim 17 wherein the provisional memory includes at least one selected from the group consisting of a FIFO memory configured to overflow the oldest provisional data as new provisional data is added, and a circular buffer configured to overwrite the oldest provisional data with the newest provisional data.

20. The portable video recorder of claim 17 wherein the capture element includes an image sensor array and wherein the image sensor array and the provisional memory are disposed on a semiconductor die.

21. The portable video recorder of claim 20:
wherein the semiconductor die further includes image compression hardware disposed thereon and configured to compress the continuous stream of video data from the image sensor array to produce the provisional data; and
wherein the semiconductor die further includes control logic configured to control the operation of the image sensor array, the image compression hardware, and the provisional memory.

22. The portable video recorder of claim 17, further comprising:
control hardware configured to selectively couple an output from the provisional memory to an output node responsive to receiving a signal from the user interface.

23. The portable video recorder of claim 22, further comprising at least one data receiving module coupled to the output node, wherein the data receiving module is selected from the group consisting of a storage memory, a flash memory, NVRAM, static RAM, a solid state disk drive, a rotating disk drive, a data interface, a radio transceiver, a radio transmitter, and an infrared interface.

24. The portable video recorder of claim 17, further comprising an electronic controller configured to keep the provisional data in memory when a command is received by the user interface to store the provisional data as permanent data.

\* \* \* \* \*